(12) United States Patent
Watanabe

(10) Patent No.: US 6,523,960 B2
(45) Date of Patent: *Feb. 25, 2003

(54) LIGHT SOURCE DEVICE AND PROJECTOR USING THE LIGHT SOURCE DEVICE

(75) Inventor: Nobuo Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/011,293

(22) Filed: Dec. 11, 2001

(65) Prior Publication Data

US 2002/0039176 A1 Apr. 4, 2002

Related U.S. Application Data

(63) Continuation of application No. 09/518,272, filed on Mar. 3, 2000.

(30) Foreign Application Priority Data

Mar. 5, 1999 (JP) .............................................. 11-58820

(51) Int. Cl.$^7$ ......................... G03B 21/28; G03B 21/14; H01R 33/00; H01R 33/02
(52) U.S. Cl. ........................... 353/98; 353/119; 353/85; 353/87; 362/226; 439/226; 439/911
(58) Field of Search ................................ 362/294, 285, 362/296, 297, 310, 264, 267, 226, 930; 353/98, 119, 122, 85, 86, 87, 97; 348/787, 788, 789; 439/226, 911, 310, 157, 297, 342

(56) References Cited

U.S. PATENT DOCUMENTS

| 3,761,170 | A | | 9/1973 | Genesky et al. ............... 353/85 |
| 5,722,753 | A | | 3/1998 | Okada et al. ................. 353/119 |
| 5,855,488 | A | | 1/1999 | Heintz et al. ................. 439/310 |
| D420,455 | S | | 2/2000 | Haba et al. ..................... D26/1 |
| D424,089 | S | | 5/2000 | Takizawa .................... D16/221 |
| 6,056,405 | A | | 5/2000 | Heintz et al. .................. 353/85 |
| 6,345,896 | B1 | * | 2/2002 | Kurosawa .................... 353/119 |

FOREIGN PATENT DOCUMENTS

| JP | A-8-160420 | 6/1996 |
| JP | A-9-245502 | 9/1997 |

* cited by examiner

Primary Examiner—Russell Adams
Assistant Examiner—Melissa Koval
(74) Attorney, Agent, or Firm—Oliff & Berridge, PLC

(57) ABSTRACT

The invention provides a light source device of an easy maintenance, and a projector using the light source device. The light source device includes a light source lamp, a reflector, a lamp housing for covering substantially entirely almost the outer surface except for an opening plane of the reflector and a front glass for covering the opening plane of the reflector. The light source device is formed so as to be integrally exchangeable as a unit in the projector. Since the lamp housing covers almost the whole surface of the reflector, even if the light source lamp and the reflector burst, fragments thereof do not scatter to the inside of the projector, there is no need to remove the outer casing to clean the inside of the device, and maintenance of the projector can be facilitated.

28 Claims, 8 Drawing Sheets

LIGHT SOURCE DEVICE AND PROJECTOR USING THE LIGHT SOURCE DEVICE

This is a Continuation of application Ser. No. 09/518,272 filed Mar. 3, 2000. The entire disclosure of the prior application(s) is hereby incorporated by reference herein in its entirety.

BACKGROUND OF THE INVENTION

1. Field of Invention

The present invention relates to a light source device and a projector using the light source device which is used in a projector for optically processing a light beam emitted from a light source to form an optical image and for enlarging and projecting the optical image through a projection lens.

2. Description of Related Art

Conventionally, projectors have been known which optically process a light beam emitted from a light source to form an optical image and which enlarge and project the optical image through a projection lens. Such projectors have been widely used for multimedia presentations at conferences, academic meetings, exhibitions, and the like.

As a light source of the above-described projectors, a light source device has been conventionally used in which a light source lamp, such as a metal halide lamp or a xenon lamp, is fixed to a reflector, from viewpoints of luminance, coloring stability, and the like.

While such a light source lamp can emit relatively stable light for several thousand hours after it is put into use, if it is used beyond that limit there is a problem in that it will exceed the usable life of the lamp, and the luminance of the light source lamp is remarkably reduced.

For this reason, in the conventional projector, a light source device exchange cover is formed on an outer casing for accommodating therein an optical system and the like, including a power supply and a light source lamp so that the light source device can be exchanged via the light source device exchange cover when the usable life of the light source lamp has been exceeded.

According to the above-described conventional projector, however, while there is no problem in exchanging the light source device resulting from the reduction in luminance of the light source lamp, but when the light source lamp and the reflector burst, it causes a problem in that fragments of the light source lamp and the reflector may scatter inside the casing, which requires that the light source should be replaced, and the outer casing should be disassembled to clean the inside of the casing.

SUMMARY OF THE INVENTION

One aspect of the present invention is to provide a light source device and a projector, wherein it is easy to maintain and there is no need to remove its outer casing to clean the inside even if the light source lamp and reflector burst.

The invention provides a light source device which is used in a projector for optically processing a light beam emitted from a light source to form an optical image and for enlarging and projecting the optical image through a projection lens, with the light source device constituting the light source section. The light source device may include a light source lamp, a reflector for reflecting light emitted from the light source lamp, and a lamp housing for covering substantially entirely the outer surface except for an opening plane of the reflector. The light source lamp, the reflector and the lamp housing are integrally formed so as to be exchangeable as a unit in the projector.

According to the present invention as described above, since the light source device includes the lamp housing for covering substantially entirely the outer surface except for the opening plane of the reflector. Thus, even if the light source lamp or the reflector bursts, fragments of the light source lamp scatter in the lamp housing, and the scattered fragments do not reach the inside of the projector, and the light source lamp and the lamp housing can be removed from the projector as a unit. Therefore, even if the light source lamp or the reflector bursts, there is no need to remove the outer casing to clean the inside of the apparatus, and it is easy to maintain the projector.

In addition, since the light source lamp and the reflector are covered with the above-described lamp housing, the light source device can be exchanged without touching the fragments scattered in the lamp housing, and exchange of the light source device can be carried out in safety.

In the foregoing description, the above-described lamp housing may preferably include a plurality of dividable components, and the reflector may preferably be fixed to any one of the plurality of components.

That is, since the lamp housing includes a plurality of dividable components in this way, it is possible to fix easily the light source lamp and the reflector to the lamp housing.

In addition, the above-described lamp housing may preferably have two components divided with reference to a line which is substantially perpendicular to the opening plane of the reflector, and the outer surface except for the opening plane of the reflector may preferably be substantially entirely covered with the two components.

That is, since such a lamp housing can be formed by two components, the configuration of the lamp housing can be simplified, and the structure of the light source device can be simplified.

Further, when the above-described lamp housing has an opening for leading cooling air to the light source lamp, the opening may preferably be provided with a scattering-preventing piece for preventing fragments of the light source lamp from scattering to the outside of the lamp housing, when the light source lamp bursts.

That is, since the lamp housing is provided with the opening for leading cooling air to the light source lamp, the service life of the light source device can be extended by preventing degradation of the light source lamp resulting from overheat. Since the opening is provided with the scattering-preventing piece, the fragments can be prevented from scattering to the outside of the lamp housing through the opening even if the light source lamp or the reflector bursts.

The above-described scattering-preventing piece may preferably be provided with a straightening vane for guiding the cooling air to the light source lamp. That is, since the scattering-preventing piece is provided with the straightening vane, the cooling air introduced through the opening is supplied by the straightening vane to thermal sections of the light source lamp and the reflector to efficiently cool them, whereby the service life of the light source device can be further extended.

In addition, the length of the above-described scattering-preventing piece may preferably be set according to the shape of the reflector. That is, the length of the scattering-preventing piece is set according to the shape of the reflector, whereby the reflector can be easily accommodated inside the lamp housing. In addition, by setting the length of the scattering-preventing piece in this way, fragments of the light source lamp can be necessarily and sufficiently prevented from scattering to the outside through the opening.

Further, one of the above-described plurality of dividable components may preferably be a cover member covering the opening of the lamp housing and provided with the scattering-preventing piece. That is, if the cover member covering the opening of the lamp housing is provided with the scattering-preventing piece, there is no need to provide the scattering-preventing piece on the lamp housing and therefore, the structure of the lamp housing can be simplified. In particular, this is advantageous from a manufacture viewpoint when the lamp housing is molded by an injection molding of synthetic resin and the like.

The present invention can be used not only as a light source device used in the projector, but also as a light source device for other applications. That is, a light source device according to the present invention may include a light source lamp, a reflector for reflecting light emitted from the light source lamp, and a lamp housing for covering substantially entirely the outer surface except for an opening plane of the reflector. The lamp housing may include a plurality of dividable components. The reflector may be fixed to any one of the plurality of components.

According to the present invention, it is possible to obtain actions and advantageous effects similar to those described above, and further, even if the components are variously restricted similarly to the above description, it is possible to obtain similar actions and advantageous effects.

DETAILED DESCRIPTION OF PREFERRED EMBODIMENTS

An embodiment of the present invention will now be described with reference to the drawings.

(1) Overall Configuration of the Device

Figure 1:
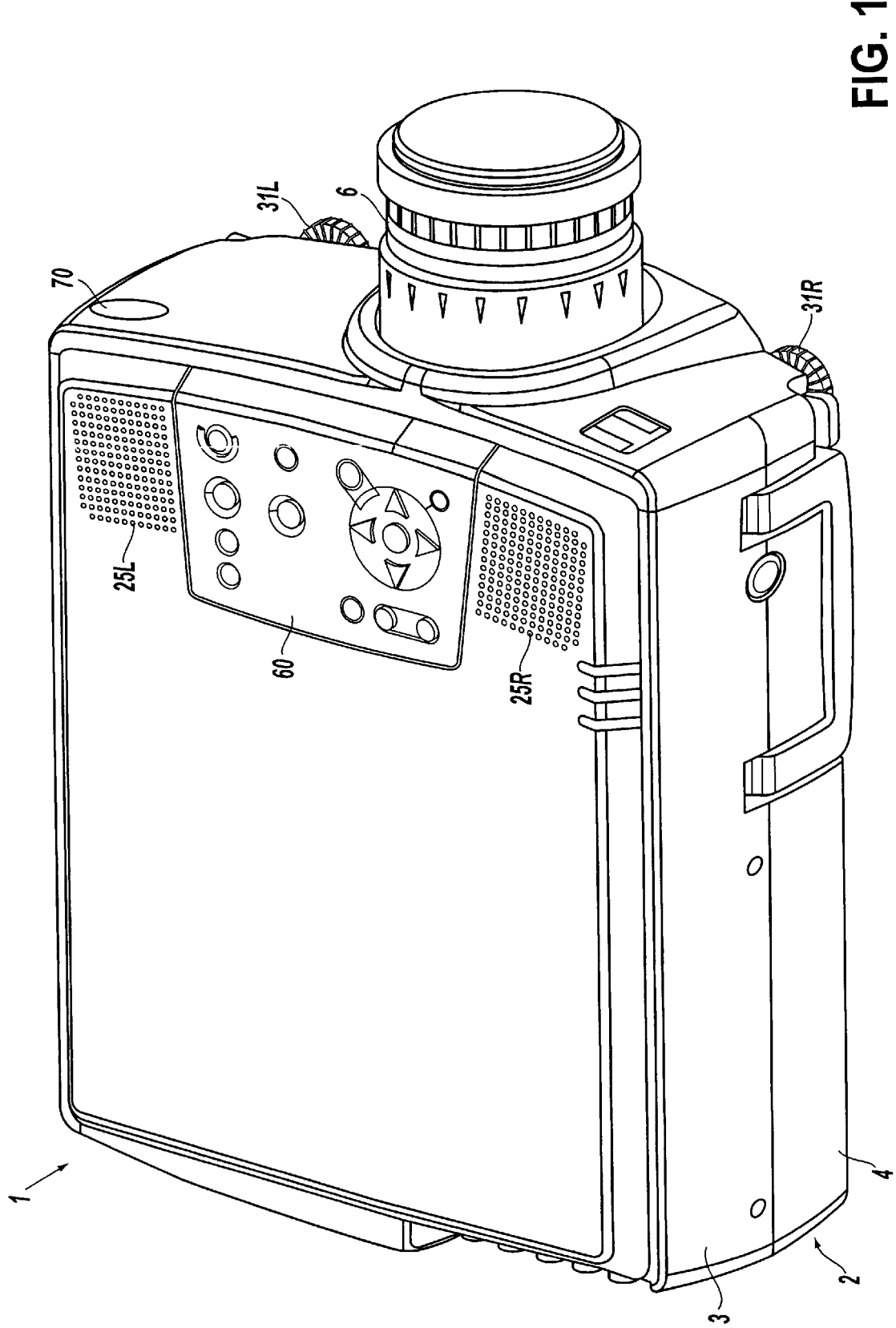
FIG. 1 is an outward perspective view of a projector according to an embodiment of the present invention, as viewed from the top side.
Figure 2:
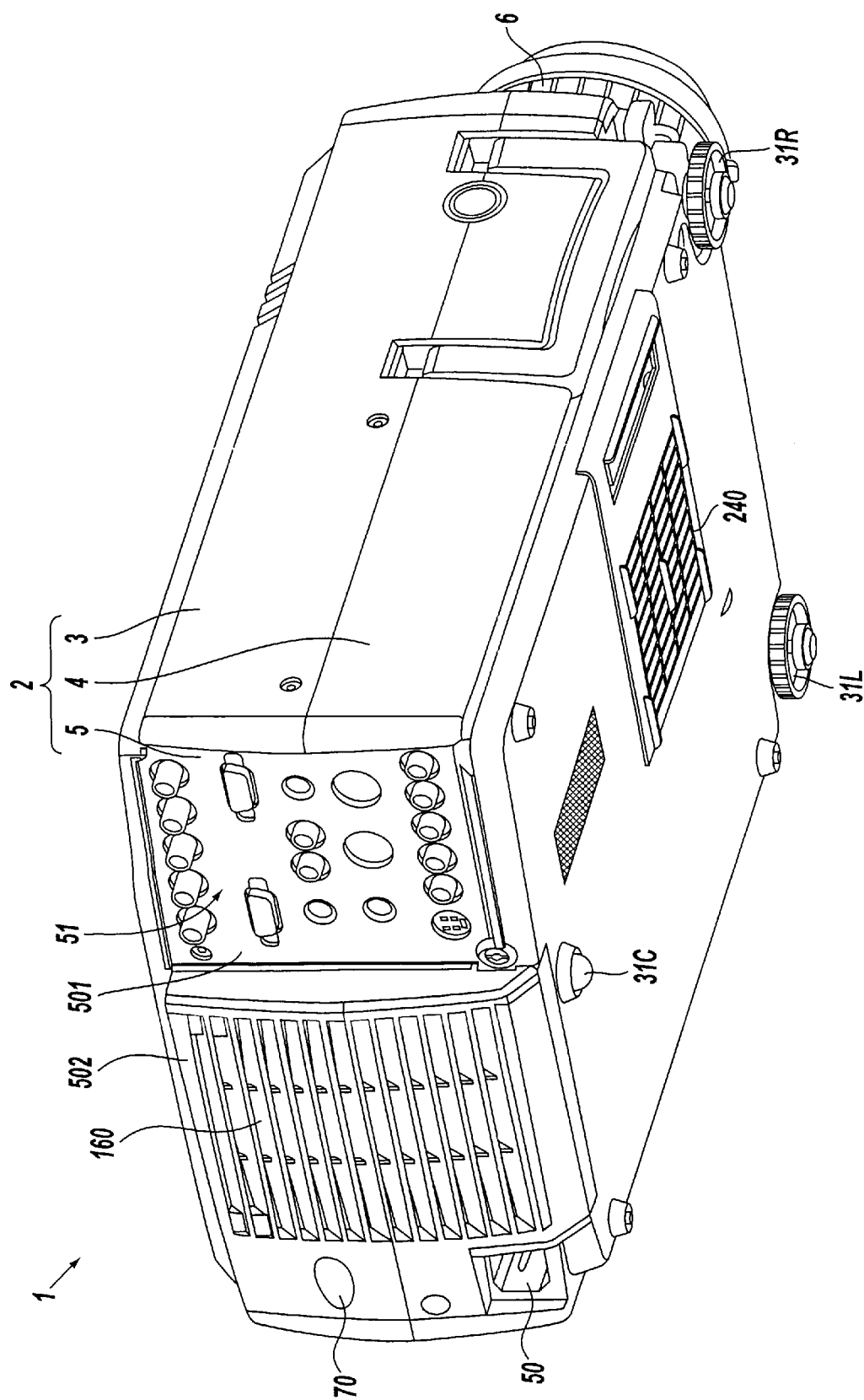
FIG. 2 is an outward perspective view of the projector of the embodiment, as viewed from the bottom side.

FIGS. 1 and 2 are schematic perspective views of a projector 1 according to this embodiment. FIG. 1 is a perspective view as viewed from the top side, and FIG. 2 is a perspective view as viewed from the bottom side.

The projector 1 of the type that separates a light beam emitted from a light source lamp as a light source into three primary colors of red (R), green (G), and blue (B), modulates these color light beam according to image information through liquid crystal panels constituting an electro-optic device, synthesizes the modulated light beam of respective colors by a prism (optical color-synthesizing system), and enlarges and displays the synthesized light beam onto a projection plane via a projection lens 6. Components are accommodated in an outer casing 2 except a part of the projection lens 6.

(2) Structure of Outer Casing

The outer casing 2 basically includes an upper casing 3 for covering the top face of the device, a lower casing 4 constituting the bottom face of the device, and a rear casing 5 (FIG. 2) for covering a rear face, and is made of metal, such as magnesium, except that the rear casing 5 is made of resin.

As shown in FIG. 1, many communication holes 25R and 25L for speakers are formed at left and right ends of the front side of the top face of the upper casing 3. In addition, a control panel 60 for adjusting image quality and so on of the projector 1 is provided between the communication holes 25R and 25L. Further, a light-receiving section 70 is provided at the upper right portion of the front of the upper casing 3 so as to receive an optical signal from a remote controller that is not shown in the figure.

As shown in FIG. 2, in substantially the center of the bottom face of the lower casing 4, there is provided an air inlet 240 for taking in cooling air for cooling the inside of the device. The air inlet 240 is provided in a filter exchange cover 241 made of resin, and the fliter exchange cover 241 is attached to and detached from the side face of the lower casing 4, whereby an internal filter can be exchanged.

In addition, the bottom face of the lower casing 4 is provided with, as shown in FIG. 2, feet 31R and 31L at the left and right front end comers thereof and a foot 31C at substantially the rear end center thereof. By controlling the amount of vertical extension or retraction of the feet 31R and 31L, the inclination of the display screen can be changed.

As shown in FIG. 2, the rear casing 5 includes an interface panel 501 on which various types of input-output terminals 51 disposed on the rear face side of the projector are formed, and a light source lamp exchange cover 502 provided with an air outlet serving as a ventilation hole for exhausting air inside the device and the light-receiving section 70. In addition, an AC inlet 50 for supplying external power is provided on the rear face side of the device. The rear casing 5 is also provided with the light-receiving section 70 similarly to the upper casing 3.

(3) Internal Structure of the Device

Figure 3:
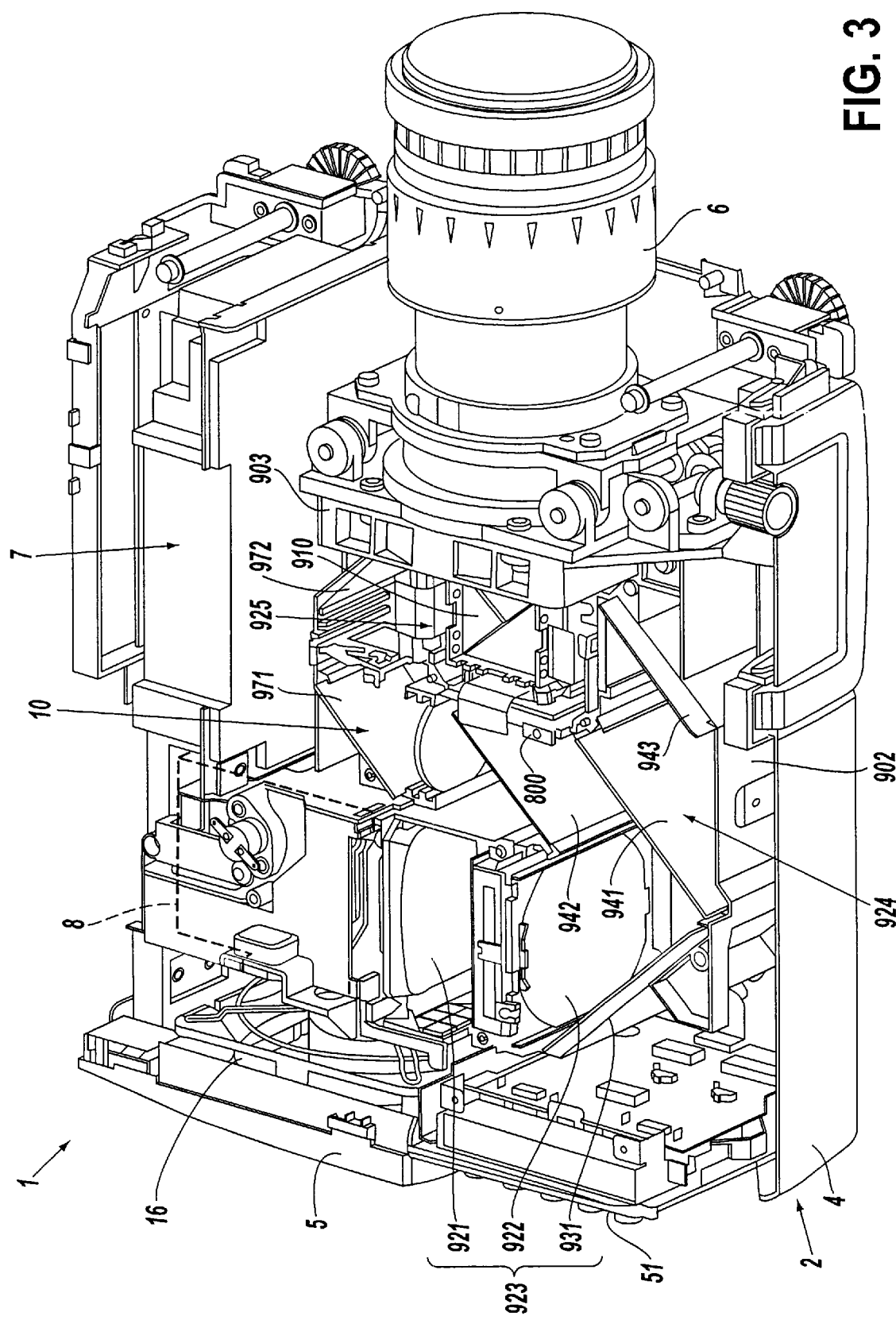
FIG. 3 is a perspective view showing the internal structure of the projector in the embodiment.

FIG. 3 shows the internal structure of the projector 1. As shown in this figure, a power supply unit 7 serving as a power supply provided on one side of a projection lens 6, a light source lamp unit 8 serving as a light source device disposed rearward of the power supply unit 7, an optical unit 10 constituting an optical system, a driver board (not shown) for driving an electro-optic device 925 provided in the unit, and a main board (not shown) for controlling the projector 1 are accommodated therein.

The power supply unit 7 transforms electric power from the AC inlet 50 to supply the power to the light source lamp unit 8, the driver board, the main board, intake fans (not shown) disposed below or both above and below the electro-optic device 925 and an exhaust fan 16 disposed rearward of the light source lamp unit 8, and the power supply unit 7 includes a lamp driving substrate for driving a light source lamp 181 of the light source lamp unit 8, in addition to a power-supply circuit board having a power supply filter, a transformer, a rectifier circuit, a smoothing circuit, and a voltage-regulating circuit, etc. formed thereon.

The light source lamp unit 8 serving as the light source device constitutes a light source portion of the projector 1, and includes, a shown in FIG. 4, the light source lamp 181, a reflector 182, and a lamp housing 184 (described hereinbelow) for accommodating them.

The optical unit 10 is a unit for optically processing a light beam emitted from the light source lamp unit 8 to form an optical image corresponding to image information, and includes an optical illuminating system 923, a optical color separation system 924, an electro-optic device 925, and a prism unit 910 serving as a optical color-synthesizing system. Other optical elements of the optical unit 10 than the electro-optic device 925 and the prism unit 910 are interposed to be held between an upper light guide (not shown) and a lower light guide 902. The upper light guide and the lower light guide 902 are integrally formed, and are fixed by fixing screws to the lower casing 4. In addition, these light guides are similarly fixed by fixing screws adjacent to the prism unit 910.

Figure 5:
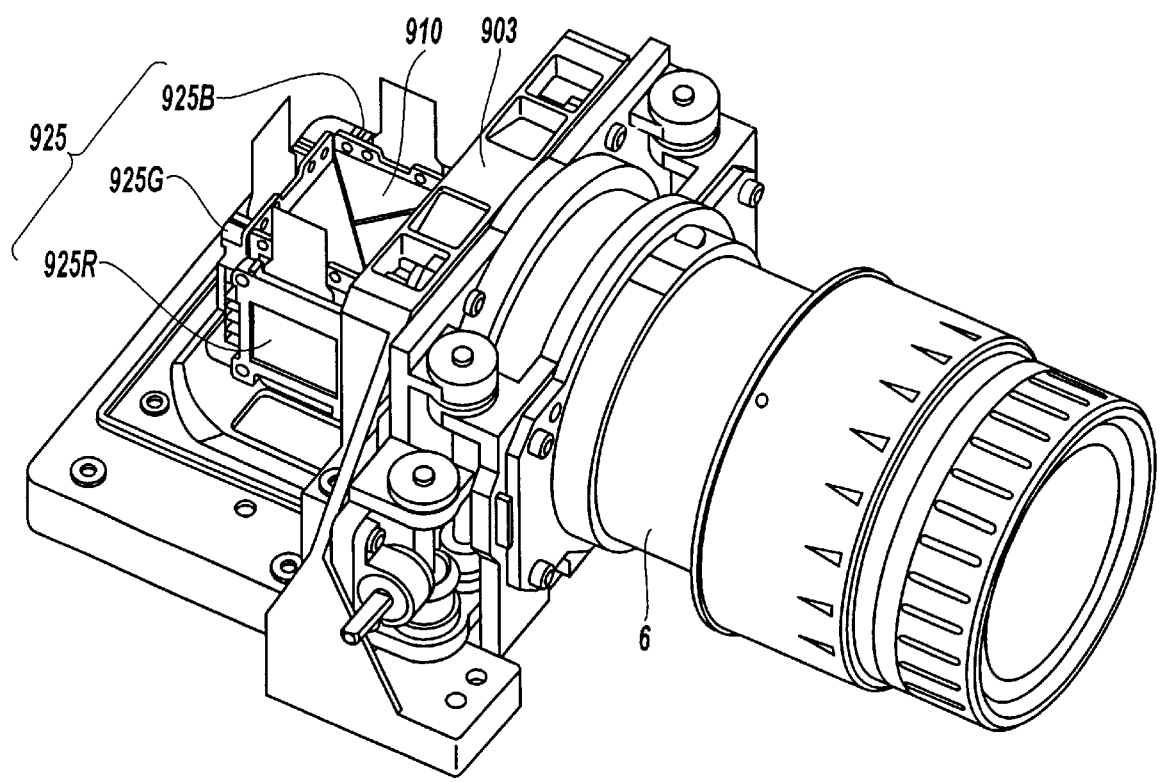
FIG. 5 is a perspective view showing the components of the embodiment.

The prism unit 910 shaped like a rectangular parallelopiped is, as shown in FIG. 5, fixed by fixed screws to a back face of a head body 903 having a substantially L-shaped side face comprising an integrally molded article of magnesium. In addition, liquid crystal panels 925R, 925G, and 925B constituting the electro-optic device 925 are fixed via fixing members to three side faces of the prism unit 910.

The driver board is intended for driving and controlling the liquid crystal panels 925R, 925G, and 925B of the electro-optic device 925, and is disposed above the optical unit 10.

The main board has a control circuit formed thereon for controlling the overall projector 1, and is disposed above the driver board. Such a main board is electrically connected to the driver board and the control panel 60.

(4) Structure of Optical System

Next, the structure of an optical system of the projector 1, that is, the optical unit 10 will be described with reference to a schematic diagram shown in FIG. 4.

As described above, the optical unit 10 includes the optical illuminating system 923 for uniformizing the in-plane illuminance distribution of a light beam (W) from the light source lamp unit 8, the optical color separation system 924 for separating the light beam (W) into red (R), green (G), and blue (B), the electro-optic device 925 for modulating color light beam R, G, and B according to image information, and the prism unit 910 serving as a optical color-synthesizing system for synthesizing the modulated color light beams.

The optical illuminating system 923 includes a first lens plate 921, a second lens plate 922 disposed on the light outgoing side of the first lens plate 921, and a reflecting mirror 931 for bending an optical axis 1a of the light beam emitted from the light source lamp unit 8 toward the front of the device 1.

The first lens plate 921 has a plurality of rectangular lenses arranged in the form of a matrix, divides the light beam emitted from a light source into a plurality of partial light beams, and condenses the partial light beams near the second lens plate 922.

The second lens plate 922 has a plurality of rectangular lenses arranged in the form of a matrix, and has the function of superimposing the partial light beams emitted from the first lens plate 921 onto the liquid crystal panels 925R, 925G, and 925B (described hereinbelow) constituting the electro-optic device 925.

In this way, according to the projector 1 of this embodiment, the liquid crystal panels 925R, 925G, and 925B can be illuminated with light having a substantially uniform illuminance by the optical illuminating system, so that a projected image having no variations in illuminance can be obtained.

The optical color separation system 924 comprises a blue-and-green-reflecting dichroic mirror 941, a green-reflecting dichroic mirror 942, and a reflecting mirror 943. First, a blue light beam B and a green light beam G contained in the light beam W emitted from the optical illuminating system 923 are reflected at light angles by the blue-and-green-reflecting dichroic mirror 941, and are directed toward the green-reflecting dichroic mirror 942.

A red light beam R passes through the blue-and-green-reflecting dichroic mirror 941, is reflected at a right angle by the rearward reflecting mirror 943, and is emitted toward the prism unit 910 from an outlet section 944 for the red light beam R.

Next, of the blue and green light beams B and G that are reflected by the blue-and-green-reflecting dichroic mirror 941, only the green light beam G is reflected at a right angle by the green-reflecting dichroic mirror 942, and is emitted toward the prism unit 910 from an outlet section 945 for the green light beam G.

The blue light beam B passing through the green-reflecting dichroic mirror 942 is emitted from an outlet section 946 for the blue light beam B toward a optical relay system 927. In this embodiment, all the distances between the outlet section for the light beam W of the optical illuminating system 923 and the outlet sections 944, 945, and 946 for the color light beams R, G, and B in the optical color separation system 924 are set to be equal.

Condenser lenses 951 and 952 are disposed on light outgoing sides of the outlet sections 944 and 945 for the red and green light beams R and G of the optical color light separation system 924. Therefore, the red and green light beams R and G emitted from the outlet sections enter the condenser lenses 951 and 952, where they are collimated.

The red and green light beams thus collimated pass through incident-side polarizers 960R and 960G, and enter the liquid crystal panels 925R and 925G serving as an optical modulation device, where they are modulated and added with further image information corresponding to each color light beam. That is, these liquid crystal panels 925R and 925G are subjected to switching control according to image information by the driver board, whereby the light of respective colors passed therethrough are modulated.

On the other hand, the blue light beam B is guided to the corresponding liquid crystal panel 925B via the optical relay system 927, where it is similarly modulated according to image information. As the liquid crystal panels 925R, 925G, and 925B of this embodiment, for example, liquid crystal panels may be employed that use a polysilicon TFT as a switching element.

The optical relay system 927 comprises a condenser lens 954 disposed on the light outgoing side of the outlet section 946 for the blue light beam B, an incident-side reflecting mirror 971, a light outgoing side reflecting mirror 972, an intermediate lens 973 disposed between these reflecting mirrors, and a condenser lens 953 disposed before the liquid crystal panel 925B, wherein the blue light beam B emitted from the condenser lens 953 passes through the incident-side polarizer 960B to enter the liquid crystal panel 925B, where it is modulated.

In this case, the optical axis 1a of the light beam W, and optical axes 1r, 1g, and 1b of the color light beams R, G, and B are formed in the same plane. The blue light beam B has the longest optical path length, that is the distance between the light source lamp 181 and the liquid crystal panel for the blue light beam B is the longest and therefore the loss of light for this light beam is the greatest. The light loss can, however, be reduced by interposing the optical relay system 927 therebetween.

Next, the color light beams R, G, and B modulated through the liquid crystal panels 925R, 925G, and 925B pass through the light outgoing side polarizers 961R, 961G, and 961B to enter the prism unit 910, where they are synthesized. A color image synthesized by the prism unit 910 is enlarged and projected via the projection lens onto a projection plane 100 located at a predetermined position.

(5) Structure of Light Source Lamp Unit 8

Figure 6:
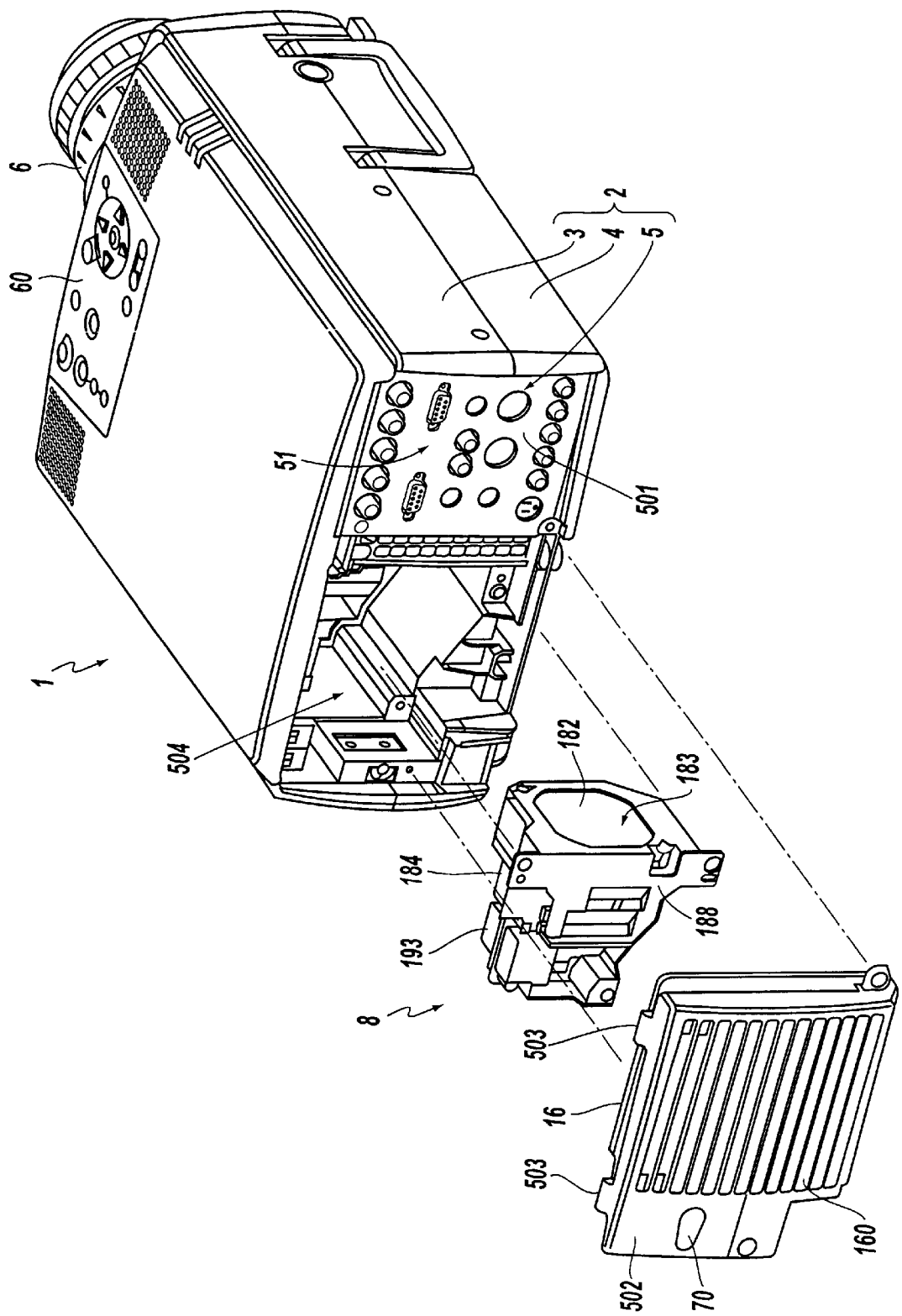
FIG. 6 is an exploded perspective view of the projector in the embodiment, as viewed from the rear side.

The light source lamp unit 8 serving as a light source device can be removed from the light source lamp exchange cover 502 provided adjacent to the interface panel 501, as shown in FIG. 6. That is, if the light source lamp exchange cover 502 is removed from the device body, a space 504 facing the light source lamp unit 8 is formed on the rear side face of the projector 1. By sliding the light source lamp unit 8 back and forth via the space 504, the light source lamp unit 8 can be attached to and detached from the device body so as to be exchanged. Although it is not shown in FIG. 6, the exhaust fan 16 is integrally mounted to the light source lamp exchange cover 502 on the side of the inner surface of the projector 1. In addition, the light source lamp exchange cover 502 engages upper two holding portions 503 with the upper casing 3, and is mounted to the device body by fixing the lower end thereof by screws to the lower casing 4.

Figure 4:
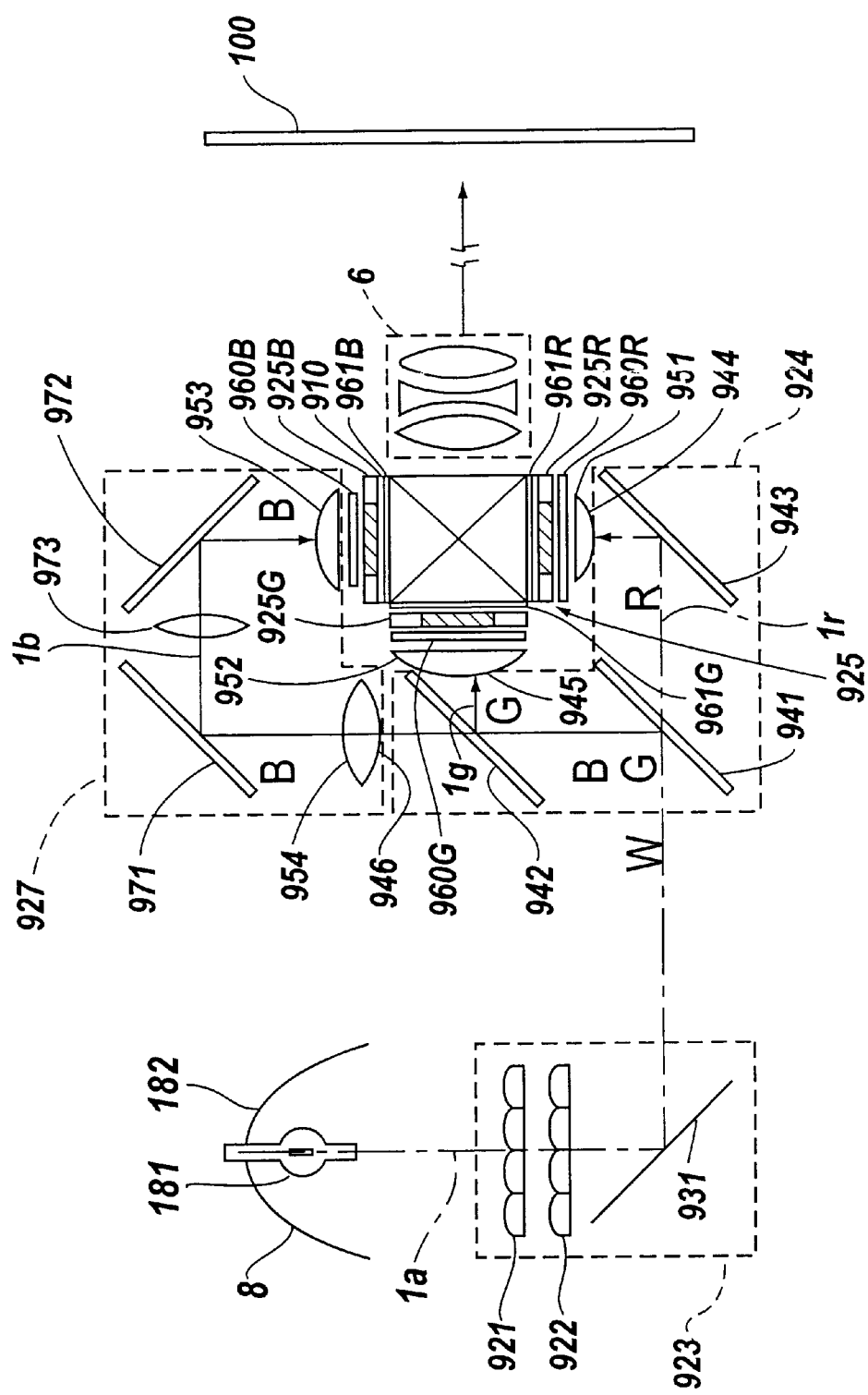
FIG. 4 is a schematic diagram for the explanation of the structure of an optical system in the embodiment.
Figure 7:
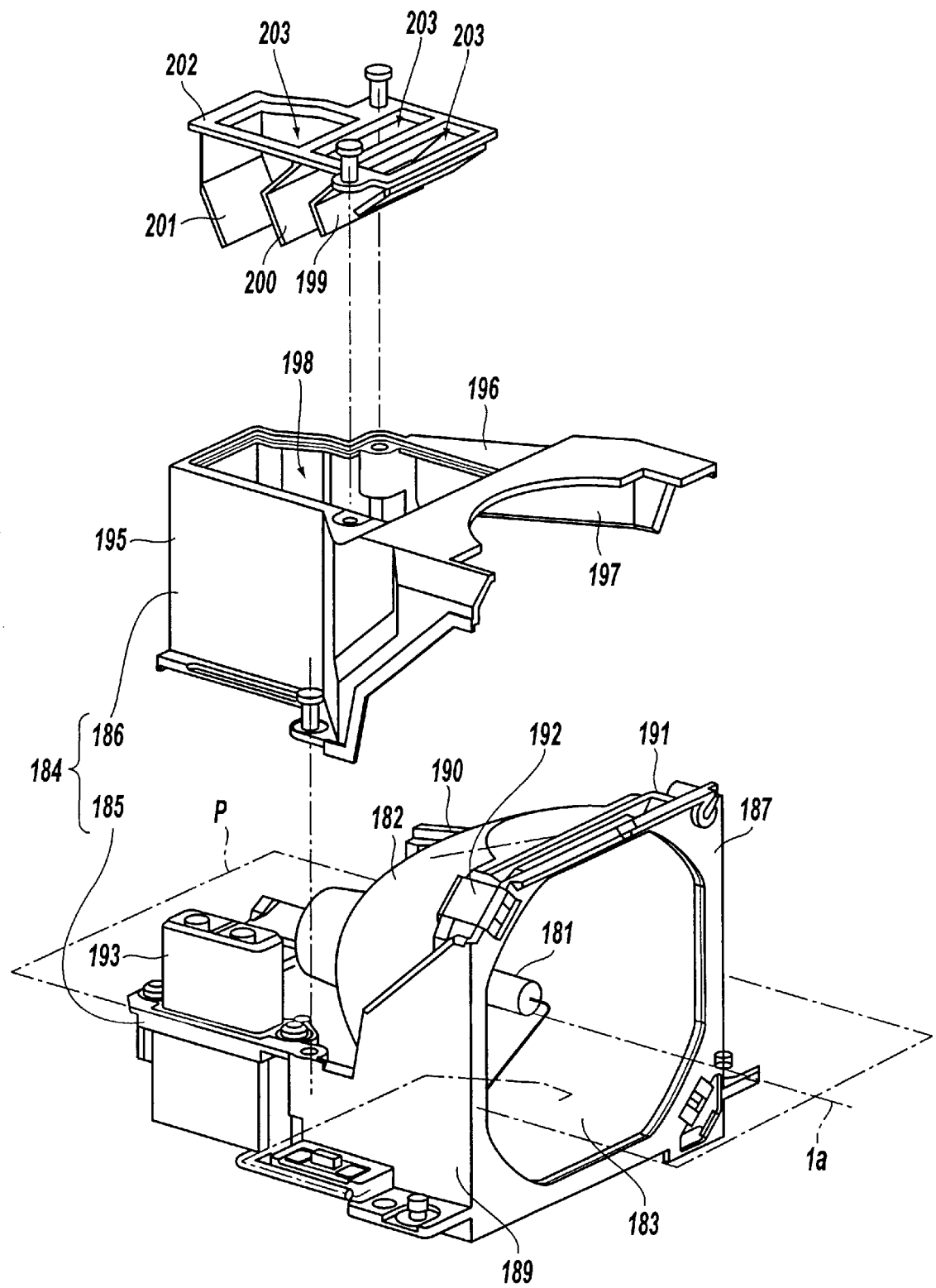
FIG. 7 is an exploded perspective view showing a structure of a light source device in the embodiment.

The light source lamp unit 8 includes a light source lamp 181, a reflector 182, a plastic lamp housing 184 for covering substantially entirely the outer surfaces except for an opening plane of the reflector 182, and a front glass 183 for covering the opening plane of the reflector 182, the various components of which are shown in either of FIGS. 4, 6, and 7.

The light source lamp 181 has a glass tube, and a pair of electrodes arranged almost linearly in the glass tube. Although it is not shown in the figures in detail, there is a hollow light-emitting portion in which light-emitting gas is enclosed, in a part of the glass tube constituting the light source lamp 181. Ends of the pair of electrodes are disposed on substantially the same axial line in the light-emitting portion, and by performing discharge between these electrodes, light is emitted. Both sides of the light-emitting portion are electrode-sealing portions, and ends of the pair of electrodes opposite to the light-emitting portion are sealed while being connected to other electrical conductive members. One end of the light source lamp 181 is fixed to substantially the center of the inner surface of the reflector 182.

The reflector 182 is a reflecting mirror for reflecting light emitted from the light-emitting portion of the light source lamp 181 toward the opening. In general, a reflector of parabolic cross section or elliptic cross section is used in the projector 1, and by suitably selecting only the shape of the reflector, or the shape of the reflector and the shape of a lens disposed near the opening thereof, the emitted light can be formed into collimated light, divergent light, or convergent light. The front glass 183 is attached to the opening plane of the reflector 182 by bonding or the like.

The reflector 182 to which the light source lamp 181 and the front glass 183 are attached is fixed to and accommodated in the lamp housing 184.

The lamp housing 184 includes a base housing 185 which is divided by a plane P passing a line 1a substantially perpendicular to the opening plane of the reflector 182 and to which the reflector 182 is mounted, and a cover housing 186 for covering a part of the outer surface of the reflector 182 that is not covered with the base housing 185, as shown in FIG. 7. The base housing 185 and the cover housing 186 are fixed by screws to be united.

The base housing 185 includes a light outgoing surface opening frame 187 that defines a light outgoing surface, a first side plate 188 (see FIG. 6) for covering one side face of the reflector 182, a second side plate 189 for covering a part of another side face of the reflector 182, and a third side plate 190 opposite to the second side plate 189. The reflector 182 is positioned with reference to the light outgoing surface opening frame 187, the first side plate 188, and the second side plate 189, and fixed by a fixed spring 191 and a U-shaped clip 192. In addition, a connector 193 for performing electrical connection with the power supply unit 7 is provided at the back of the second side plate 189 of the base housing 185, and an information carrier section 194 is provided on a side thereof. The information carrier section 194 is used for having the main board added up the operating time of the light source lamp 181, and it carries information, such as whether or not the light source lamp 181 is in use, or how many hours of use remain for the light source lamp 181.

The cover housing 186 includes side plates 195, 196 and 197 for covering a portion of the outer surface of the reflector 182 fixed to the base housing 185 that is not covered with the base housing 185, and an opening 198 for introducing cooling air for cooling the light source lamp 181 is formed on the side plate 196. A cover member 202 provided with a plurality of scattering-preventing pieces 199, 200, and 201 is mounted in the opening 198. The cover member 202 is fixed by screws to the cover housing 186.

Figure 8:
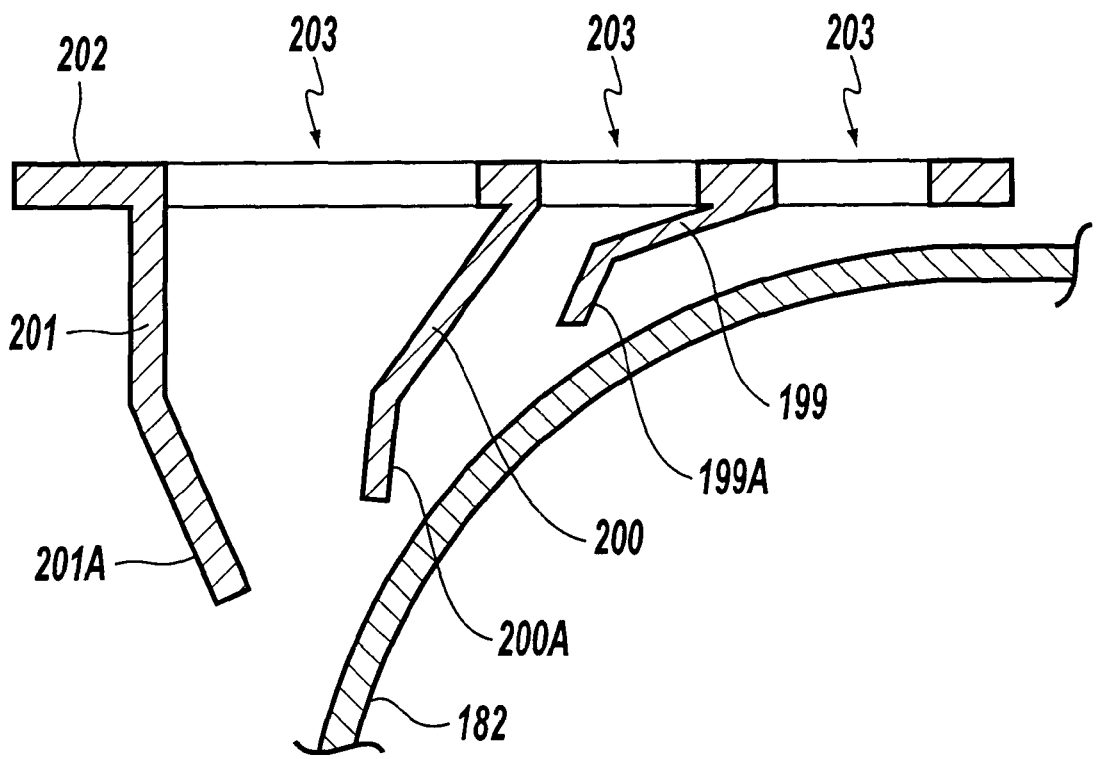
FIG. 8 is a sectional view showing the relative positions between scattering-preventing pieces and a reflector in the embodiment.

The scattering-preventing pieces 199, 200, and 201 protrude from an end of a small opening 203 formed in the cover member 202 in an out-of-plane direction of the cover member 202, and have protruding sizes corresponding to the shape of the back face of the reflector 182. More specifically, as shown in FIG. 8, an amount of protrusion of the scattering-preventing piece 199 is set to be small, and an angle formed between the scattering-preventing piece 199 and the plane of the cover member 202 is set to be small. The amount of protrusion of the scattering-preventing pieces 200 and 201 and angles formed between these pieces and the planes of the cover member 202 are set to increase gradually according to the shape of the back face of the reflector 182. Heads of the scattering-preventing pieces 199, 200, and 201 are provided with straightening vanes 199A, 200A, and 201A for leading cooling air introduced from small openings 203. The cooling air flowing along the scattering-preventing pieces 199, 200, and 201 is changed in its direction by the straightening vanes 199A, 200A, and 201A to flow to the outer surface of the reflector 182.

Next, a description will be given of the flow of the cooling air for cooling the above-described light source lamp unit 8. First, an intake fan (not shown) provided below the electro-optic device 925 takes in cooling air from the air inlet 240 to cool the electro-optic device 925. The cooling air cools the electro-optic device 925 and flows along the main board and the driver board (not shown) disposed above the electro-optic device 925 to reach the light source lamp unit 8 while cooling circuit elements provided on these boards, and is supplied from the small openings 203 into the light source lamp unit 8. The cooling air supplied from the small openings 203 is changed in its direction by the straightening vanes 199A, 200A, and 201A, and flows along the back face of the reflector 182 to cool the light source lamp 181 and the reflector 182 and then, is discharged through the gaps of the lamp housing 184 to the outside of the device by the exhaust fan 16.

(6) Advantages of the Embodiment

The above-described embodiment provides the following advantages. That is, the light source lamp unit 8 includes the lamp housing 184 for covering substantially entirely the outer surface except for the opening plane of the reflector 182. In addition, the front glass 183 is attached to the opening plane of the reflector 182, and the front glass 183 is not likely to burst because it is disposed at a position far away from the light-emitting portion of the light source lamp, as compared with the reflector 182. Therefore, even if the light source lamp 181 and the reflector 182 burst, and fragments thereof scatter in the lamp housing 184 and do not scatter to other sections of the projector 1. Therefore, even if the light source lamp 181 and the reflector 182 burst, there is no need to remove the light source lamp unit 8 to from the projector 1 and disassemble the outer casing 2, so as to clean the inside of the projector 1. Thus, maintenance of the projector 1 can be facilitated.

In addition, since the light source lamp 181 and the reflector 182 are covered with the above-described lamp housing 184, the light source lamp unit 8 can be exchanged without touching the fragments scattered in the lamp housing 184, and exchange of the light source lamp unit 8 can be performed safely.

Further, since the lamp housing 184 comprises a plurality of dividable components, such as the base housing 185 and the cover housing 186, the light source lamp 181 and the reflector 182 can be easily fixed to the lamp housing 184.

Since two components, namely the base housing 185 and the cover housing 186 can constitute the lamp housing 184, the structure of the lamp housing 184 can be simplified and the structure of the light source lamp unit 8 can be simplified.

In addition, since the opening 198 is formed in the cover housing 186 that constitutes the lamp housing 184, degradation of the light source lamp 181 resulting from overheating can be prevented by introducing cooling air from the opening 198, and service life of the light source lamp unit 8 can be extended. Since the opening 198 is covered with the cover member 202 on which the scattering-preventing pieces 199, 200, and 201 are provided, even if the light source lamp 181 bursts, fragments can be prevented from scattering to the outside of the lamp housing 184 through the opening 198.

Further, since the heads of the scattering-preventing pieces 199, 200, and 201 are provided with the straightening vanes 199A, 200A, and 201A, the cooling air introduced through the small openings 203 of the cover member 202 is changed its direction. The cooling air cools the base end of the light source lamp 181 and the outer surface of the reflector 182, and the cooling is efficiently performed, whereby the service life of the light source lamp unit 8 can be further extended.

Since the length of the scattering-preventing pieces 199, 200, and 201 is set according to the shape of the reflector 182, when the reflector 182 is accommodated in the lamp housing 184, the pieces are not obstacles and the reflector 182 can be easily accommodated. By setting the length of the scattering-preventing pieces 199, 200, and 201 in this way, even if the light source lamp 181 or the reflector 182 bursts, fragments can be sufficiently prevented from scattering to the outside through the opening 198.

In addition, since the cover member 202 for covering the opening 198 of the lamp housing is provided with scattering-preventing pieces 199, 200, and 201, there is no need to provide the scattering-preventing pieces on the lamp housing 184, and the structure of the lamp housing 184 can be simplified. In particular, when the lamp housing is molded by an injection molding and the like, such a configuration is advantageous from a manufacture viewpoint.

Further, since almost the whole surface of the light source lamp 181 is covered with a plastic lamp housing 184, a long edge-face distance between the electrode of the base end of the light source lamp 181 and the other metallic portions of the projector can be obtained, and the discharge therebetween can be prevented and the light source lamp 181 can be allowed to emit light with a suitable luminance. This is particularly effective when the high-intensity light source lamp 181 is employed.

Since the scattering-preventing pieces 199, 200, and 201 and the cover housing 186 are formed separately, the lamp housing 184 can be easily molded by an injection molding or the like. In addition, the shape of the scattering-preventing pieces 199, 200, and 201 can be suitably changed according to the shape of the reflector 182, and general versatility of the lamp housing 184 is increased.

(7) Modifications of Embodiment

The present invention is not limited to the above-described embodiment, and includes the following modifications.

While the light source lamp unit 8 is removed from the light source lamp exchange cover 502 of the rear casing 5 in the above embodiment, it is not limited thereto. That is, the light source lamp exchange cover 502 may be formed on a side face of the device or the bottom face of the device other than the rear casing, or on the top face of the device. That is, wherever the light source lamp exchange cover 502 may be provided, the present invention can be utilized.

In addition, while the lamp housing 184 and the scattering-preventing pieces 199, 200, and 201 are formed separately in the above embodiment, the scattering-preventing pieces may be integrally formed with the lamp housing. This can reduce the number of members of the light source device.

Also while the front glass 183 for covering the opening plane of the reflector 182 is provided in the above embodiment, since the amount of scattering from the opening plane is smaller than that of scattering from the other planes, it is not always necessary to provide the front glass 183. However, if the front glass 183 is provided, the reflector 182 can be completely covered therewith. Thus, the front glass 183 may preferably be provided in that the scattering of the light source lamp 181 and the reflector 182 can be almost completely prevented.

Further, while the electro-optic device 925 is comprises TFT-drive liquid crystal panels 925R, 925G, and 925B in the above embodiment, the present invention may be applied to a projector including an optical modulation device formed by another driving method.

While the electro-optic device 925 comprises the three liquid crystal panels 925, 925G, and 925 in the above embodiment, the present invention may be applied to an optical modulation device comprising a single or two liquid crystal panels.

In addition, while the panels constituting the electro-optic device 925 comprise liquid crystal elements in the above embodiment, the present invention may be applied to a projector including an optical modulation device comprising device panels using plasma elements or micro-mirrors other than the liquid crystal.

Further, while the electro-optic device 925 in the above embodiment is of a type that transmits and modulates light beams R, G, and B, the present invention may be applied to a projection display device including a reflective optical modulation device which modulates incident light while reflecting it to emit.

While the projector 1 using the electro-optic device 925 has been described in the above embodiment, it is also possible to apply the present invention to a projector, such as an overhead projector, which does not use the electro-optic device 925.

In addition, while the light source lamp unit 8 is used as a light source device of the projector 1 in the above embodiment, it may be used, for example, as a light source device for a spotlight and the like. In short, the present invention can be applied to various devices which need a light source.

According to the present invention as described above, since the outer surface except for the opening plane of the reflector is substantially entirely covered with the lamp housing, and the light source lamp, the reflector, and the lamp housing are integrally formed so as to be exchangeable as a unit, even if the light source lamp and the reflector burst, the fragments thereof do not scatter inside the apparatus and the light source lamp, the reflector and the lamp housing can be removed from the projector as a unit. Therefore, even if the light source lamp and the reflector burst, there is no need to disassemble the outer casing to clean the inside, and maintenance of the projector can be facilitated.

What is claimed is:

1. A light source device used in a projector that optically processes a light beam emitted from a light source to form an optical image, the projector enlarging and projecting the optical image using a projection lens, and the light source device comprising:

a light source unit having a light source lamp and a reflector that reflects light emitted from the light source lamp; and a lamp housing that substantially covers an outer surface of the light source unit, the lamp housing having an uncovered opening plane to a front of the reflector, the light source lamp, the reflector, and the lamp housing being integrally formed as a unit in the projector so that the unit may be exchangeable, the lamp housing being comprised of a plurality of dividable components, the plurality of dividable components surrounding a rear portion of the reflector.

2. The light source device as claimed in claim 1, the reflector being fixed to any one of the plurality of dividable components.

3. The light source device as claimed in claim 1, the outer surface except for the opening plane of the reflector being substantially covered with the plurality of dividable components.

4. The light source device as claimed in claim 1, the lamp housing having an opening for leading cooling air to the reflector, and the opening being provided with a scattering-preventing piece that prevents fragments of the light source lamp or the reflector from scattering to outside of the lamp housing, when the light source lamp or the reflector bursts.

5. The light source device as claimed in claim 4, the scattering-preventing piece being provided with a straightening vane that guides the cooling air to the light source lamp.

6. The light source device as claimed in claim 4, a length of each scattering-preventing piece being set to accommodate the shape of the reflector.

7. The light source device as claimed in claim 4, one of the plurality of dividable components being a cover member that covers the opening and is provided with the at least one scattering-preventing piece.

8. A light source device, comprising:

a light source unit having a light source lamp and a reflector that reflects light emitted from the light source lamp; and a lamp housing that substantially covers an outer surface of the light source unit, the lamp housing having an uncovered opening plane to a front of the reflector and comprising a plurality of dividable components, the reflector being fixed to any one of the plurality of dividable components, the plurality of dividable components surrounding a rear portion of the reflector.

9. The light source device as claimed in claim 8, the outer surface except for the opening plane of the reflector being substantially covered with the plurality of dividable components.

10. The light source device as claimed in claim 8, the lamp housing having an opening for leading cooling air to the reflector, and the opening being provided with a scattering-preventing piece that prevents fragments of the light source lamp or the reflector from scattering to outside of the lamp housing, when the light source lamp or the reflector bursts.

11. The light source device as claimed in claim 10, the scattering-preventing piece being provided with a straightening vane that guides the cooling air to the light source lamp.

12. The light source device as claimed in claim 10, a length of each scattering-preventing piece being set to accommodate the shape of the reflector.

13. The light source device as claimed in claim 10, one of the plurality of dividable components being a cover member that covers the opening and is provided with the at least one scattering-preventing piece.

14. A projector comprising:

a light source unit having a light source lamp and a reflector that reflects light emitted from the light source lamp;

a lamp housing that substantially covers an outer surface of the light source unit, the lamp housing having an uncovered opening plane to a front of the reflector, the light source lamp, the reflector, and the lamp housing being integrally formed as a unit in the projector so that the unit may be exchangeable, the lamp housing being comprised of a plurality of dividable components, the plurality of dividable components surrounding a rear portion of the reflector;

a modulation device that modulates light reflected by the reflector; and a projection lens that projects the light modulated by the modulation device.

15. The light source device as claimed in claim 14, the reflector being fixed to any one of the plurality of dividable components.

16. The light source device as claimed in claim 14, the outer surface except for the opening plane of the reflector being substantially covered with the plurality of dividable components.

17. The projector as claimed in claim 14, the lamp housing having an opening for leading cooling air to the reflector, and the opening being provided with a scattering-preventing piece that prevents fragments of the light source lamp or the reflector from scattering to outside of the lamp housing, when the light source lamp or the reflector bursts.

18. The projector as claimed in claim 17, the scattering-preventing piece being provided with a straightening vane that guides the cooling air to the light source lamp.

19. The light source device as claimed in claim 17, a length of each scattering-preventing piece being set to accommodate the shape of the reflector.

20. The light source device as claimed in claim 17, one of the plurality of dividable components being a cover member that covers the opening and is provided with the at least one scattering-preventing piece.

21. The projector as claimed in claim 14, further comprising:
a power supply;
a driver board that drives and controls the modulation device;
a control circuit that controls the projector in entirety; and
an outer casing that accommodates the light source lamp, the reflector, the lamp housing, the modulation device, the projection lens, the power supply, the driver board, and the control circuit.

22. The light source device as claimed in claim 21, the outer surface except for the opening plane of the reflector being substantially covered with the plurality of dividable components.

23. A projector comprising:
a light source unit having a light source lamp and a reflector that reflects light emitted from the light source lamp;
a lamp housing that substantially covers an outer surface of the light source unit, the lamp housing having an uncovered opening plane to a front of the reflector and comprising a plurality of dividable components, the reflector being fixed to any one of the plurality of dividable components, the plurality of dividable components surrounding a rear portion of the reflector;
a modulation device that modulates light reflected by the reflector; and
a projection lens that projects the light modulated by the modulation device.

24. The projector as claimed in claim 23, the lamp housing having an opening for leading cooling air to the reflector, and the opening being provided with a scattering-preventing piece that prevents fragments of the light source lamp or the reflector from scattering to outside of the lamp housing, when the light source lamp or the reflector bursts.

25. The projector as claimed in claim 24, the scattering-preventing piece being provided with a straightening vane that guides the cooling air to the light source lamp.

26. The light source device as claimed in claim 24, a length of each scattering-preventing piece being set to accommodate the shape of the reflector.

27. The light source device as claimed in claim 24, one of the plurality of dividable components being a cover member that covers the opening and is provided with the at least one scattering-preventing piece.

28. The projector as claimed in claim 22, further comprising:
a power supply;
a driver board that drives and controls the modulation device;
a control circuit that controls the projector in entirety; and
an outer casing that accommodates the light source lamp, the reflector, the lamp housing, the modulation device, the projection lens, the power supply, the driver board, and the control circuit.

* * * * *

UNITED STATES PATENT AND TRADEMARK OFFICE
CERTIFICATE OF CORRECTION

PATENT NO. : 6,523,960 B2
DATED : February 25, 2003
INVENTOR(S) : Nobuo Watanabe It is certified that error appears in the above-identified patent and that said Letters Patent is hereby corrected as shown below:

Column 12,
Line 65, change "The light source device" to -- The projector --.

Column 13,
Lines 1, 14, 17 and 31, change "The light source device" to -- The projector --.

Column 14,
Lines 21 and 24, change "The light source device" to -- The projector --.
Line 28, change "claim 22" to -- claim 23 --.

Signed and Sealed this

Thirtieth Day of March, 2004

JON W. DUDAS
*Acting Director of the United States Patent and Trademark Office*